Nov. 2, 1965  D. A. DEARLE  3,215,303
CLOSURE FOR OPENINGS IN THE WALLS OF
ELECTRICAL OUTLET BOXES AND THE LIKE
Filed Feb. 14, 1963
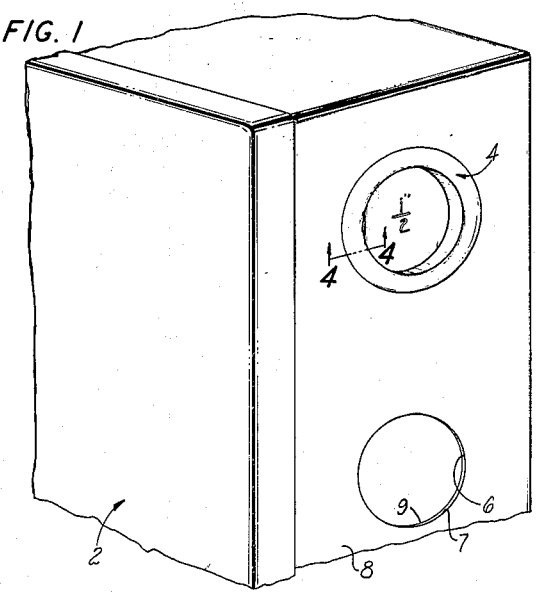
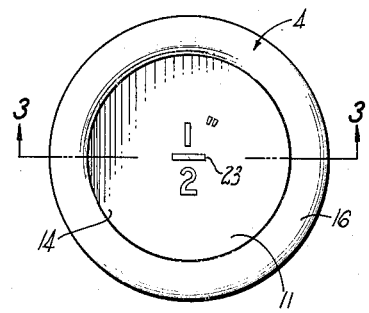
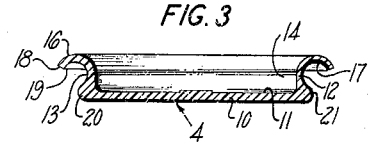
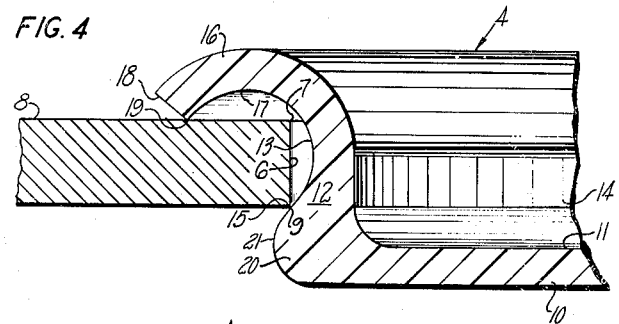
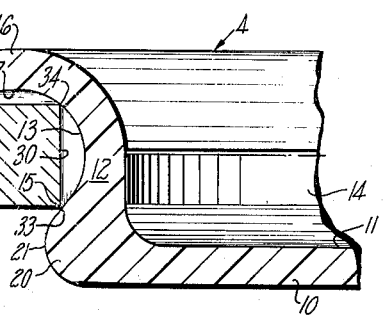
INVENTOR.
DENIS A. DEARLE
BY Lindsey, Prutzman and Hayes
ATTORNEYS

United States Patent Office 3,215,303
Patented Nov. 2, 1965

3,215,303
CLOSURE FOR OPENINGS IN THE WALLS OF ELECTRICAL OUTLET BOXES AND THE LIKE
Denis A. Dearle, New Britain, Conn., assignor to North & Judd Manufacturing Company, New Britain, Conn., a corporation of Connecticut
Filed Feb. 14, 1963, Ser. No. 258,457
3 Claims. (Cl. 220—27)

This invention generally relates to closures and more specifically to an improved plug particularly suitable for closing knockout openings in electrical outlet boxes, and the like.

One of the objects of the present invention is to provide an improved plug that will effectively close knockout openings in electrical outlet boxes and the like despite various manufacturing tolerances that may exist in the size of the openings as well as the thickness of the surrounding outlet box walls and which nevertheless will be securely retained in the opening even against inadvertent dislodgment therefrom. Included in this object is the provision of such a plug that will self-adjust to the particular dimensional characteristics of the knockout opening including the surrounding wall thereof as well as any irregularities such as burrs or the like that may exist in the latter.

A further object of the present invention is to provide such an improved plug that is extremely compact and will occupy a minimum of space on opposite sides of the outlet box wall in which it is placed and that may be easily and quickly inserted into a knockout opening with a minimum of effort and without requiring special tools.

A still further object of the present invention is to provide such an improved plug that is possessed of an extremely lightweight and smooth-surfaced construction which may be economically manufactured from a high dielectric strength material that will not be adversely affect by extreme weather or temperature conditions.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIG. 1 is a fragmental perspective view of a junction box incorporating an embodiment of the improved plug of the present invention;

FIG. 2 is a plan view of the improved plug shown in FIG. 1;

FIG. 3 is a cross-sectional view taken generally along lines 3—3 of FIG. 2;

FIG. 4 is an enlarged cross-sectional view in fragment taken generally along lines 4—4 of FIG. 1; and FIG. 5 is a view similar to FIG. 4 but showing the plug applied to an opening in an outlet box wall having a greater thickness.

The improved plug of the present invention is particularly suitable for closing openings in electrical boxes as well as electrical conduits such as raceways. Referring to the drawing in detail, an electrical junction box generally designated 2 in shown in FIG. 1 for illustrative purposes as incorporating a plug generally designated 4 embodying the invention and shown as sealing one of the knockout openings 6 provided in the wall 8 of the junction box 2.

In the preferred embodiment, the plug 4 comprises an integral body formed from a flexible, resilient, and high dielectric strength material such as a suitable polyethylene plastic. The plug body 4 includes a planar base wall 10 and an annular upstanding wall 12 forming with the base wall 10, a shallow central recess or cavity 14. The base wall 10 and portions of the annular wall 12 are formed with a greater external diameter than the opening 6 to provide good sealing and retaining results when the plug is inserted in the opening. If desired, a size mark may be provided on the top surface 11 of the base wall 10 such as the embossed mark 23 in the illustrated embodiment.

In accordance with the invention, there is formed a thin annular rim or flange 16 of arcuate cross section projecting radially outwardly from the top end of annular wall 12 and then downwardly toward the base wall 10. The extreme peripheral wall or rim 18 of the flange 16 is formed to extend at an angle, preferably of approximately 30°, with respect to the base wall 10 to provide an annular sealing edge 19.

As best shown in FIG. 4, the external surface 13 of the annular wall 12 and the undersurface 17 of the flange 16 are concavely formed in merging relationship with each other and preferably with the same radius of curvature thereby forming a generally semicircular pattern terminating at one end in an annular lip or projection 20 located around the base wall 10. Additionally, the peripheral surface 21 of the lip 20 is reversely curved with respect to the external surface 13 of the annular wall 12 to facilitate insertion and removal of the plug into and out of the opening to be sealed and further to eliminate sharp edges thereby presenting a rounded surface in the junction box which will not cut or abrade the electrical installations therein.

In use, the plug 4 is applied to the opening 6 from the outside of the box 2 by forcing the base wall 10 through the opening 6 into the interior of the box 2 where it will be disposed in generally parallel and close relationship to the wall 8 thereof as shown in FIG. 4. This may be conveniently accomplished through means of thumb pressure applied to the upper surface 11 of the base wall 10. Passage of the base wall 10 through the opening 6, despite the greater diameter of the base wall 10 when compared to the opening 6, is characterized by deformation of the plug body as permitted by the inherent flexibility thereof and is facilitated by the curved surface 21 of the lip 20 which engages the upper or outer edge 7 of the opening 6 during initial insertion of the plug in the opening.

When the plug 4 is finally in place as shown in FIG. 4, portion 15 of the external surface 13 of the annular wall 12 will firmly engage the lower or inner edge 9 of the opening 6 because of the greater diameter of the external annular wall 13 at point 15 when compared to that of opening 6. Additionally, the flange 16 is deformed in a clockwise direction (as viewed in the drawing) by engagement with wall 8 since the distance between the flange edge 19 and the point 15 on the external wall surface 13, when the plug is in a natural or unflexed state, is less than the thickness of the box wall 8, which causes the flange edge 19 to firmly engage the external surface of the wall 8 around the opening 6 as clearly shown in FIG. 4. The dual engagement between the closure 4 and the wall 8 not only serves to securely retain the plug in the opening 6 but further provides a double seal which will prevent entry of foreign matter into the junction box 2.

This improved retaining and sealing effect will be obtained by the plug 4 regardless of irregularities that might exist in the shape of the opening 6 or in the surrounding wall 8 thereof since such irregularities will be accommodated by the concavity of the plug sealing surfaces 13, 17. Likewise, the concavity of the sealing surfaces 13, 17 of the plug is such as to accommodate knockout openings of slightly varying diameters while at the same time providing the above-described effective sealing results.

The plug 4 may be utilized with equal advantage to seal openings in walls of various thicknesses because of the inherent flexibility of the flange 16 which permits the plug to adjust to the particular thickness of the wall around the opening being sealed. In FIG. 5, the plug 4 is shown sealing an opening 30 in an outlet box wall 32 having a greater thickness than that of the wall 8 of the junction box 2. In this application of the plug, the annular wall 12 thereof additionally engages the support wall 32 at the upper or outer edge 34 of the opening and the flange 16 undergoes a greater deformation which results from the increased thickness of the outlet box wall 32 as compared to that of the wall 8. The result is that the plug 4 is firmly held in the opening 30 and a triple seal is produced at the opposite edges 33, 34 of the opening 30 and at the external surface 35 of the wall 32 around the opening 30.

From the above, it will be seen that the present invention provides an improved plug that is extremely adaptable for effectively sealing holes which have slight dimensional variances and which are located in junction boxes and the like having various wall thicknesses and despite constructional irregularities that might exist in the wall around the holes. Additionally, it will be seen that the plug of the present invention is of a durable and lightweight construction which may be manufactured at extremely low cost and which may be easily and rapidly inserted into a knockout opening in an electrical box wall where it will occupy a minimum of space and will not harmfully affect the electrical installations or apparatus therein.

As will be apparent to persons skilled in the art, various modifications and adaptations of the structure above described will become readily apparent without departure from the spirit and scope of the invention, the scope of which is defined in the appended claims.

I claim:

1. For closing an opening in a wall member wherein variances occur in the diameter of the opening and in the thickness of its surrounding wall member, a removable closure comprising an imperforate dishlike body having a flat base, a flexible annular lip projecting radially outwardly from the periphery of the base and having a convex outer surface merging with the bottom of the base, an annular wall having a concave outer surface extending upwardly from the periphery of the base, the annular wall being of increased thickness at the bottom thereof merging into the annular lip, and an annular arcuate flange flaring outwardly from the top of the annular wall and forming therewith configuration of generally semicircular cross section, the annular wall and flange of the closure being composed of a resilient material flexible to alter the radius of curvature and axial length of their curved outer surfaces.

2. In combination with a wall member having an opening wherein variances occur in the diameter of the opening and the thickness of its surrounding wall member, a removable closure for closing the opening comprising an imperforate dish-like body including a flat base positioned generally parallel with the wall member, an annular wall extending upwardly from the base and received in the opening, the annular wall having a concave outer surface engageable with at least one edge of the opening, an annular arcuate flange concavely curved in continuation with the top of the annular wall to form therewith a configuration of generally semicircular cross section, the concave outer surface of the flange spaced from and overlying the external surface of the wall member surrounding the opening, the annular wall and flange member of the closure being composed of a resilient material flexible to alter the radius of curvature and axial length of their curved outer surfaces to thereby adjust to the variances in the diameter of the opening and thickness of its surrounding wall member, and a resilient annular lip projecting radially outwardly from the periphery of the base and having a convex outer surface merging with the bottom of the annular wall and the bottom of the base, the outer convex surface of the lip spaced from and underlying the internal surface of the wall member surrounding the opening.

3. The closure as recited in claim 2 wherein a rim of the flange extends at an angle with respect to the plane containing the base of the closure, the rim having an edge engageable with the external surface of the wall member surrounding the opening.

References Cited by the Examiner

UNITED STATES PATENTS

| 2,948,937 | 8/60 | Rapata | 174—153 X |
| 3,027,494 | 3/62 | Rayburn | 174—153 X |

FOREIGN PATENTS

| 661,829 | 11/51 | Great Britain. |
| 823,722 | 11/59 | Great Britain. |

JOHN F. BURNS, *Primary Examiner.*

JOHN P. WILDMAN, E. JAMES SAX, *Examiners.*